United States Patent
Abe

(10) Patent No.: US 7,441,150 B2
(45) Date of Patent: Oct. 21, 2008

(54) FAULT TOLERANT COMPUTER SYSTEM AND INTERRUPT CONTROL METHOD FOR THE SAME

(75) Inventor: Shinji Abe, Tokyo (JP)

(73) Assignee: NEC Corporation, Tokyo (JP)

(*) Notice: Subject to any disclaimer, the term of this patent is extended or adjusted under 35 U.S.C. 154(b) by 491 days.

(21) Appl. No.: 11/311,404

(22) Filed: Dec. 20, 2005

(65) Prior Publication Data

US 2006/0150005 A1    Jul. 6, 2006

(30) Foreign Application Priority Data

Dec. 21, 2004    (JP)    .............................. 2004-369875

(51) Int. Cl.
    G06F 11/00    (2006.01)
(52) U.S. Cl. .......................................... 714/12; 714/11
(58) Field of Classification Search .................. 714/10, 714/11, 12, 13
    See application file for complete search history.

(56) References Cited

U.S. PATENT DOCUMENTS

| | | | | |
|---|---|---|---|---|
| 3,959,638 | A | * | 5/1976 | Blum et al. ................... 714/11 |
| 4,412,281 | A | * | 10/1983 | Works ............................... 714/4 |
| 4,610,013 | A | * | 9/1986 | Long et al. ..................... 714/11 |
| 4,638,432 | A | * | 1/1987 | Niblock et al. ............... 710/260 |
| 4,979,108 | A | * | 12/1990 | Crabbe, Jr. .................. 718/106 |
| 5,157,663 | A | * | 10/1992 | Major et al. ................... 714/10 |
| 5,204,952 | A | * | 4/1993 | Ayers et al. ................... 714/48 |
| 5,255,367 | A | * | 10/1993 | Bruckert et al. ............... 714/11 |
| 5,301,308 | A | * | 4/1994 | Daar et al. ..................... 714/12 |
| 5,384,769 | A | * | 1/1995 | Oprescu et al. ............. 370/276 |
| 5,588,111 | A | * | 12/1996 | Cutts et al. ..................... 714/9 |
| 5,638,507 | A | * | 6/1997 | Akai et al. ..................... 714/13 |
| 5,737,513 | A | * | 4/1998 | Matsuda et al. ............... 714/11 |
| 5,951,669 | A | * | 9/1999 | Bailey et al. ................. 710/260 |
| 5,958,069 | A | * | 9/1999 | Kawasaki et al. ............. 714/11 |
| 5,978,932 | A | * | 11/1999 | Nishiyuki et al. ............. 714/11 |
| 6,035,417 | A | * | 3/2000 | Kanazawa ..................... 714/13 |
| 6,038,685 | A | * | 3/2000 | Bissett et al. .................. 714/12 |
| 6,141,769 | A | * | 10/2000 | Petivan et al. ................. 714/10 |
| 6,148,415 | A | * | 11/2000 | Kobayashi et al. ............ 714/15 |
| 6,308,286 | B1 | * | 10/2001 | Richmond et al. ............ 714/13 |
| 6,327,670 | B1 | * | 12/2001 | Hellenthal et al. ............. 714/5 |
| 6,438,707 | B1 | * | 8/2002 | Ronstrom ..................... 714/13 |
| 6,473,869 | B2 | * | 10/2002 | Bissett et al. .................. 714/12 |
| 6,477,607 | B1 | * | 11/2002 | Jeong ......................... 710/305 |

(Continued)

FOREIGN PATENT DOCUMENTS

JP    9-251443 A    9/1997

*Primary Examiner*—Marc Duncan
*Assistant Examiner*—Joshua P Lottich
(74) *Attorney, Agent, or Firm*—Sughrue Mion, PLLC

(57) ABSTRACT

A fault tolerant (FT) computer system includes a primary system and a secondary system. The primary system includes a first CPU; a first FT control section connected with the first CPU; and a first south bridge connected electrically and operatively with the first FT control section. The secondary system includes a second CPU; a second FT control section connected with the second CPU; and a second south bridge connected electrically with the second FT control section and not connected operatively with the second FT control section. The first FT control section and the second FT control section are connected by a link section, and the primary system and the secondary system operate in synchronization with each other by using the link section, except for the second south bridge.

19 Claims, 11 Drawing Sheets

U.S. PATENT DOCUMENTS

| | | | |
|---|---|---|---|
| 6,496,940 B1 * | 12/2002 | Horst et al. | 714/4 |
| 6,578,158 B1 * | 6/2003 | Deitz et al. | 714/11 |
| 6,687,851 B1 * | 2/2004 | Somers et al. | 714/12 |
| 6,694,449 B2 * | 2/2004 | Ghameshlu et al. | 714/11 |
| 6,708,285 B2 * | 3/2004 | Oldfield et al. | 714/11 |
| 6,708,286 B2 * | 3/2004 | Alexander et al. | 714/11 |
| 6,862,645 B2 * | 3/2005 | Garnett | 710/306 |
| 6,874,103 B2 * | 3/2005 | Cepulis | 714/13 |
| 6,918,062 B2 * | 7/2005 | Wang et al. | 714/43 |
| 6,948,092 B2 * | 9/2005 | Kondo et al. | 714/12 |
| 6,978,397 B2 * | 12/2005 | Chan | 714/12 |
| 6,978,398 B2 * | 12/2005 | Harper et al. | 714/13 |
| 7,003,692 B1 * | 2/2006 | Banks et al. | 714/12 |
| 7,028,218 B2 * | 4/2006 | Schwarm et al. | 714/11 |
| 7,055,061 B2 * | 5/2006 | Nitta | 714/13 |
| 7,065,672 B2 * | 6/2006 | Long et al. | 714/11 |
| 7,181,642 B1 * | 2/2007 | Heideman et al. | 714/6 |
| 7,194,652 B2 * | 3/2007 | Zhou et al. | 714/4 |
| 7,197,664 B2 * | 3/2007 | Khosravi | 714/12 |
| 7,366,948 B2 * | 4/2008 | Michaelis et al. | 714/12 |
| 2002/0029309 A1 * | 3/2002 | Lee | 710/240 |
| 2004/0117687 A1 * | 6/2004 | Smith | 714/13 |
| 2004/0153756 A1 * | 8/2004 | Tsukahara | 714/13 |
| 2004/0153857 A1 * | 8/2004 | Yamazaki et al. | 714/43 |
| 2004/0255190 A1 * | 12/2004 | Sidhu et al. | 714/13 |
| 2005/0102557 A1 * | 5/2005 | Davies et al. | 714/11 |
| 2005/0160312 A1 * | 7/2005 | Seng et al. | 714/13 |
| 2005/0289391 A1 * | 12/2005 | Ichikawa et al. | 714/13 |
| 2006/0150002 A1 * | 7/2006 | Yoshida | 714/10 |
| 2006/0150006 A1 * | 7/2006 | Mizutani | 714/11 |
| 2007/0043972 A1 * | 2/2007 | Graham et al. | 714/12 |

* cited by examiner

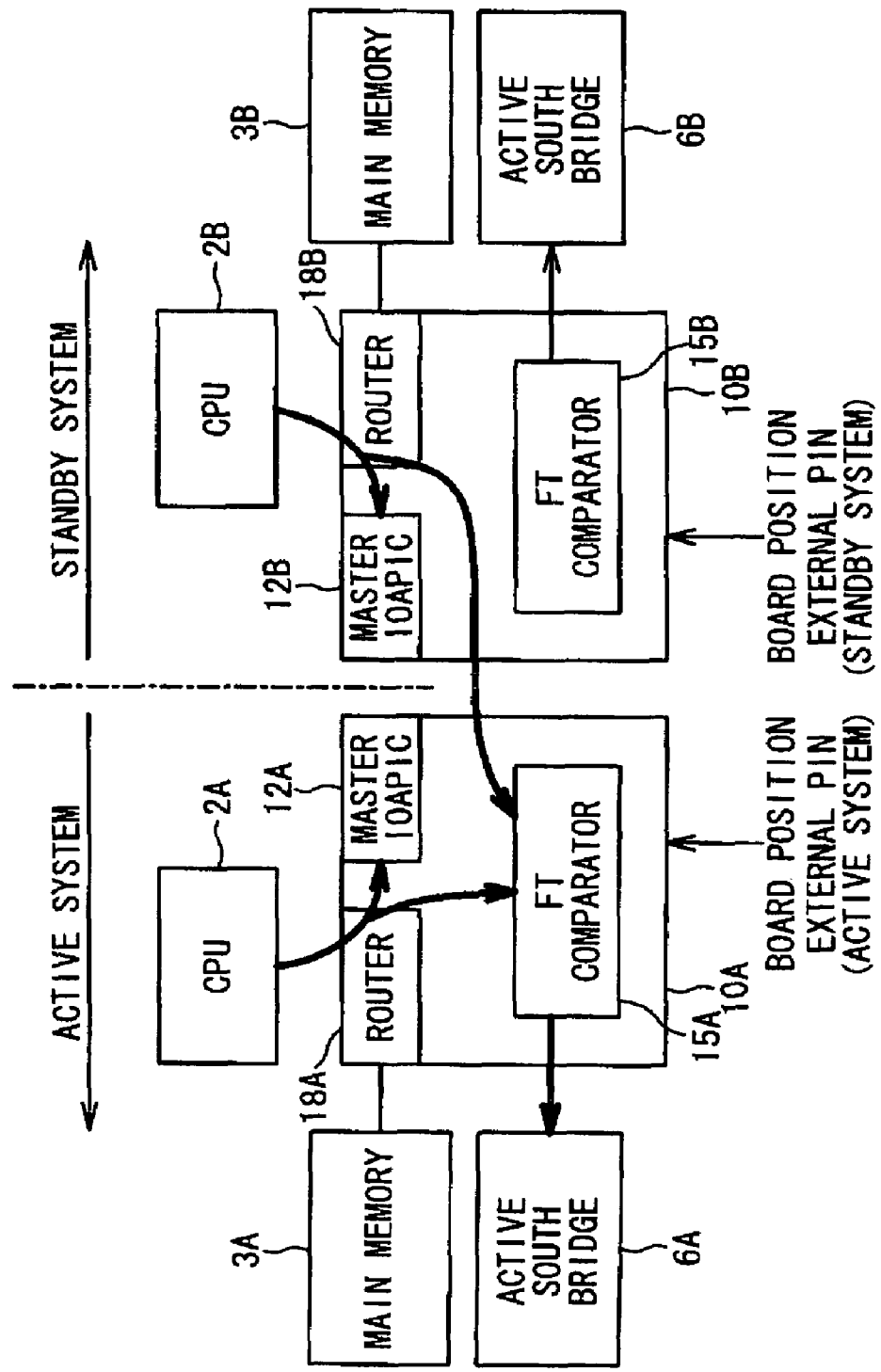

Fig. 9

| SOUTH BRIDGE IOAPIC IRQ TABLE | | FT CONTROLLER MASTER IOAPIC IRQ TABLE | |
|---|---|---|---|
| 0 | INTR | 0 | INTR |
| 1 | KEYBOARD | 1 | KEYBOARD |
| 2 | TIMER | 2 | TIMER |
| 3 | COM. PORT #1 | 3 | COM. PORT #1 |
| 4 | COM. PORT #2 | 4 | COM. PORT #2 |
| 5 | PARALLEL PORT #1 | 5 | PARALLEL PORT #1 |
| 6 | FLOPPY DISK | 6 | FLOPPY DISK |
| 7 | PARALLEL PORT #2 | 7 | PARALLEL PORT #2 |
| 8 | REAL TIME CLOCK | 8 | REAL TIME CLOCK |
| 9 | | 9 | |
| 10 | | 10 | |
| 11 | | 11 | |
| 12 | MOUSE | 12 | MOUSE |
| 13 | FLOATING POINT UNIT | 13 | FLOATING POINT UNIT |
| 14 | PRIMARY IDE DISK | 14 | PRIMARY IDE DISK |
| 15 | SECONDARY IDE DISK | 15 | SECONDARY IDE DISK |
| 16 | EXTERNAL INT #A | 16 | EXTERNAL INT #A |
| 17 | EXTERNAL INT #B | 17 | EXTERNAL INT #B |
| 18 | EXTERNAL INT #C | 18 | EXTERNAL INT #C |
| 19 | EXTERNAL INT #D | 19 | EXTERNAL INT #D |
| | | 20 | PCI BRIDGE #1 INT #A |
| | | 21 | PCI BRIDGE #1 INT #B |
| | | 22 | PCI BRIDGE #1 INT #C |
| | | 23 | PCI BRIDGE #1 INT #D |
| | | 24 | PCI BRIDGE #1 INT #E |
| | | 25 | PCI BRIDGE #1 INT #F |
| | | 26 | PCI BRIDGE #1 INT #G |
| | | 27 | PCI BRIDGE #1 INT #H |

EXTERNAL INTERRUPT LINE INPUTS A-D (MESSAGE) FROM PCI BRIDGE

FAULT TOLERANT COMPUTER SYSTEM AND INTERRUPT CONTROL METHOD FOR THE SAME

BACKGROUND OF THE INVENTION

1. Field of the Invention

The present invention generally relates to a duplex system of controllers. More specifically, the present invention is directed to a fault tolerant computer system in which interrupt controls are duplexed.

2. Description of the Related Art

As a computer system with high reliability, a fault tolerant computer system is known. In the fault tolerant computer system, all of hardware modules of the computer system are duplexed or multiplexed. All of these hardware modules operate in synchronization with each other, and even if a failure has occurred in a certain portion of a hardware module, the failed hardware module is disconnected from the above-described tolerant computer system, and the operation is continued by the remaining normal hardware modules. As a result, a fault resistant characteristic is improved.

FIG. 1 shows an example of a configuration of the fault tolerant computer system. The fault tolerant computer system of this example is provided with a fault tolerant (FT) control section 10, and hardware modules such as CPUs, memories, and I/O devices are duplexed. The FT control section 10 is connected to the hardware modules and carries out synchronization processing and switching control when a failure has occurred.

In the fault tolerant computer system shown in FIG. 1, a CPU (or CPU groups) 2A, a main memory 3A and a part of FT control section 10 constitute one CPU sub-system, and another CPU sub-system is provided to have completely the same configuration as the CPU sub-system 1A. Thus, the two sets of CPU sub-systems 1A and 1B are duplexed. Similarly, I/O devices (I/O device groups) 5A and 5B having the same configuration are duplexed and constitute an I/O sub-system. The FT control section 10 is located at a center of these hardware modules, and controls each of these hardware modules such as the CPU sub-systems 1A and 1B, and the I/O device groups 5a and 5B to keep the synchronous operation between the CPU sub-systems and to detect a failure. Also, the FT control section 10 also controls to disconnect a failed hardware module from the fault tolerant computer system. Although the two sets of the CPU sub-systems 1A and 1B are present in the computer system of FIG. 1, the failed sub-system is logically disconnected from the FT control section 10, and a process is continued by the remaining set of the CPU sub-system and the I/O sub-system.

Generally speaking, the fault tolerant computer system is divided into a portion which is duplexed in a hardware manner, and a portion which is duplexed in a software manner. For example, CPU sub-systems 1A and 1B are bases on which software is executed, and these CPU sub-systems 1A and 1B must be duplexed in a hardware manner. When a failure has occurred in one CPU sub-system, the FT control section 10 disconnects either the CPU or memory of the CPU sub-system, in which the failure has occurred, from the computer system, and carries out a control in such a manner that an adverse influence does not affect the CPU and the memory operating normally. On the other hand, when a failure has occurred in the I/O device, the FT control section 10 detects the failure and notifies the occurrence of the failure to software for controlling the I/O device (to be referred to as an "I/O device driver", hereinafter). Thus, it is possible to switch the I/O devices in a software manner. In this case, the I/O device driver stops drive of the I/O device in which the failure has occurred, and drives the other of the duplexed I/O devices. This is realized as switching of the I/O devices used in the I/O sub-system.

However, some of the I/O devices cannot be duplexed in the software manner. For instance, an interrupt controller is one of such devices that cannot be duplexed in the software manner. The interrupt controller receives an interrupt request issued from each of the I/O devices or the like, and notifies the interrupt request to the CPU. The interrupt request is allocated with an interrupt number called "IRQ" by an operating system (OS). In a certain case, a plurality of I/O devices are allocated to a single interrupt number. The interrupt controller converts the interrupt request issued from each of the devices into the predetermined interrupt number, and then notifies the interrupt number to the CPU. At this time, while the CPU is presently executing an interrupt process corresponding to a certain interrupt number, the interrupt controller does not notify the interrupt request having the same interrupt number or manages the interrupt requests issued from the plurality of devices such that the interrupt requests are not lost. For this purpose, the interrupt controller internally executes a process of holding a status corresponding to the interrupt request on execution. Therefore, if a failure has occurred in the interrupt controller, all of the data for the interrupt request would be lost. As a result, it is not possible to recover the interrupt controller to the original status in software.

Further, although present operating systems (OSs) such as the "Windows" (registered trademark) and the "Linux" allow existence of plurality of interrupt controllers, these operating systems cannot cope with a state that interrupt controllers are increased or decreased during the operation. Therefore, the interrupt controllers which have been present when the computer system was started must be present until the operating system is shut down, and must continue to operate in the normal state.

By the way, present PC servers direct to an open-system, and when the PC server should be manufactured in a low cost, the Intel-compatible (Intel is a registered trademark) CPU and electronic components which are commercially available in low prices are necessarily selected. Also, the Windows and the Linux are major operating systems in the present PC servers and have been designed based upon the Intel-compatible architecture. However, in the open-system PC servers, when a fault tolerant computer system should be configured in a low cost, there are many problems.

For instance, the most I/O devices and the most operating systems such as the "Windows" are not designed under consideration of the fault tolerant computer system. Therefore, even if the devices are duplexed, the PC server cannot completely cope with a fail-over process on a failure. In the Intel-compatible PC server, the interrupt control depends on a special I/O device on which the legacy functions called "south bridge" are concentrated. Particularly, since the interrupt control is one central function of the system operation, the operating system directly accesses the south bridge to control the operation of the south bridge. For this reason, if a failure has occurred once in the south bridge, the function of this operating system is completely lost. As a result, a system-down is caused. Also, it is practically impossible to modify the operating system such as the Windows, which has been mainly used in the open-system PC server, to adapt for the fault tolerant computer system.

In conjunction with the above description, Japanese Laid-open Patent Application (JP-A-Heisei 9-251443) discloses a processor fault recovering method for an information processing system. In this conventional example, the information processing system has a plurality of processors, at least one of which operates as a system supporting processor. The remaining processors operate as instruction processors. In such an information processing system, when a failure has occurred in one processor, an interrupt is issued to an operating system (OS) which is running on at least one instruction processor. The operating system recognizes that the failure has occurred in the instruction processor, and stops an application program being executed on the instruction processor when the interrupt is issued, and then replaces the above-described instruction processor by the system supporting processor.

SUMMARY OF THE INVENTION

An object of the present invention is to provide a fault tolerant computer system in which two systems are duplexed and operate in synchronization with each other.

Another object of the present invention is to provide a fault tolerant computer system in which an interrupt request can be kept when a system is switched from an active system to a standby system.

Another object of the present invention is to provide a fault tolerant computer system in which a failure of a south bridge can be hidden to a CPU.

Another object of the present invention is to provide a fault tolerant computer system in which synchronization operation can be completely recovered even when a fault tolerant control section is replaced by a new fault tolerant control section.

It is an object of the present invention to provide a fault tolerance computer system in which interrupt controllers can be duplexed even in a computer system (server) in which an existing OS and an existing south bridge are installed without considering the fault tolerant computer system.

In an aspect of the present invention, a fault tolerant (FT) computer system includes a primary system and a secondary system. The primary system includes a first CPU; a first FT control section connected with the first CPU; and a first south bridge connected electrically and operatively with the first FT control section. The secondary system includes a second CPU; a second FT control section connected with the second CPU; and a second south bridge connected electrically with the second FT control section and not connected operatively with the second FT control section. The first FT control section and the second FT control section are connected by a link section, and the primary system and the secondary system operate in synchronization with each other by using the link section, except for the second south bridge.

Here, the first CPU and the second CPU operate on a same operating system, and the second south bridge is invisible from the operating system.

Also, the first FT control section preferably has a first master I/O Advanced Programmable Interrupt Controller (IOAPIC) control section, and the second FT control section has a second master IOAPIC control section. The first south bridge has a PIC control section and an IOAPIC control section. The address space of the IOAPIC control section in the first south bridge is same as a part of an address space of the first master IOAPIC control section, and the address space of the IOAPIC control section in the second south bridge is same as a part of an address space of the second master IOAPIC control section.

Also, the first and second FT control sections have first and second configuration/status storage sections configured to store setting data and status data of the primary and secondary systems, respectively. When a failure has occurred in the first south bridge while the primary system and the secondary system operate synchronously as an active system and a standby system, respectively, the setting data and the status data in the first configuration/status storage section of the first FT control section are forwarded to the second configuration/status storage section in the second FT control section. Then, the secondary system operates as the active system.

Also, the primary system further includes a first PCI bridge connected with the first FT control section and a first I/O device group connected with the first PCI bridge. The secondary system further includes a second PCI bridge connected with the second FT control section and a second I/O device group connected with the second PCI bridge. When the primary system is set as an active system and the secondary system is set to a standby system to operate in synchronization with the primary system, a first interrupt request from one of I/O devices of the first I/O device group is forwarded to the first CPU through the PIC control section of the first south bridge and the first master IOAPIC control section in a legacy mode in which the operating system does not yet operate.

In this case, the first interrupt request is preferably forwarded to the second CPU through the link and the second master IOAPIC control section of the second FT control section, and to the first master IOAPIC control section of the first FT control section in a predetermined delay time.

Also, a second interrupt request from the first south bridge is preferably forwarded to the first CPU through the first IOAPIC control section, and is forwarded to the second CPU through the link and the second IOAPIC control section of the second FT control section, in an extension mode, in which the operating system operates, after the legacy mode.

In this case, in the extension mode, the second interrupt request from one of I/O devices of the first I/o device group is preferably forwarded to the first CPU through the first master IOAPIC control section and forwarded to the second CPU through the link and the second master IOAPIC control section.

Also, in the extension mode, a third interrupt request from one of I/O devices of the second /O device group is preferably forwarded to the second CPU through the second master IOAPIC control section, and is forwarded to the first CPU through the link and the first master IOAPIC control section.

Also, the first and second FT control sections further comprise the first and second status storage sections which store setting data of the primary and secondary systems and status data which show statuses of the primary and secondary systems, respectively. The first IOAPIC control section stores the received interrupt request other than the first interrupt request and the status data of the primary system at that time in the first status storage section. The second IOAPIC control section stores the received interrupt request other than the first interrupt request and the status data of the primary system at that time in the second status storage section.

Also, the first and second FT control sections may have first and second status storage sections which store setting data of the primary and secondary systems and status data which shows status of the primary and secondary systems, respectively. When a discrepancy of the storage data is detected between the first and second status storage sections while the first CPU and the second CPU operate in synchronization with each other, an SMI (system management interrupt) handler stops operations of the first CPU and the second CPU and controls the first and second FT control sections such that the setting data/status data stored in the first and second status storage sections are coincident with each other.

In another aspect of the present invention, a fault tolerant computer system includes a primary system and a secondary system. The primary system includes a first CPU, a first FT control section connected with the first CPU, a first south bridge connected electrically and operatively with the first FT control section, a first PCI bridge connected with the first FT control section, and a first I/O device group connected with the first PCI bridge. The secondary system includes a second CPU, a second FT control section connected with the second CPU, a second south bridge connected electrically and not connected operatively with the second FT control section, a second PCI bridge connected with the second FT control section, and a second I/O device group connected with the second PCI bridge. The first FT control section and the second FT control section are connected by a link section, and the first FT control section has a first master IOAPIC control section and the second FT control section has a second master IOAPIC control section. Each of the first CPU and the second CPU has a first interrupt path and a second interrupt path. A first interrupt generated in the primary system at a time of a start is forwarded to the first and second CPU through the first and second master IOAPIC control sections and the first interrupt path, and a second interrupt generated in the primary system or the secondary system at a time of operation is forwarded to the first and second CPUs through the first and second master IOAPIC control sections and the second interrupt path.

Also, another aspect of the present invention, an interrupt control method is achieved by providing a fault tolerant computer system including a primary system and a secondary system, wherein the primary system includes a first CPU, a first FT control section connected with the first CPU, a first south bridge connected electrically and operatively with the first FT control section, a first PCI bridge connected with the first FT control section, and a first I/O device group connected with the first PCI bridge, the secondary system includes a second CPU, a second FT control section connected with the second CPU, a second south bridge connected electrically and not connected operatively with the second FT control section, a second PCI bridge connected with the second FT control section, and a second I/O device group connected with the second PCI bridge. The first FT control section and the second FT control section are connected by a link section, and the first FT control section has a first master IOAPIC control section and the second FT control section has a second master IOAPIC control section. The interrupt control method is achieved by further transferring a first interrupt request issued from one of I/O devices of the first I/O device group to the first master IOAPIC control section in a legacy mode, in which an operating system does not yet operate, when the primary system is set as an active system and the secondary system is set as an standby system and operates in synchronization with the primary system; forwarding the first interrupt request to the second master IOAPIC control section of the second FT control section through the link section; transferring the first interrupt request to the first CPU from the first master IOAPIC control section by transferring the first interrupt request to the first master IOAPIC control section through the PIC control section of the first south bridge; and transferring the first interrupt request to the second CPU from the second master IOAPIC control section by transferring the first interrupt request to the second master IOAPIC control section through the PIC control section of the second south bridge.

Here, a timing when the first interrupt request may reach the first master IOAPIC control section is same as a timing when the first interrupt request reaches the second master IOAPIC control section.

Also, the interrupt control method may be achieved by further forwarding a second interrupt request issued from the second south bridge from the first IOAPIC control section to the first CPU in an extension mode, in which the operating system operates, after the legacy mode; and forwarding the second interrupt request from the second IOAPIC control section of the second FT control section to the second CPU through the link.

Also, the interrupt control method may be achieved by further forwarding the second interrupt request to the first CPU through the first master IOAPIC control section in the extension mode; and forwarding the second interrupt request to the second CPU through the link and the second master IOAPIC control section.

Also, the interrupt control method may be achieved by further forwarding a third interrupt request from one of I/O devices of the second I/O device group in the extension mode to the second CPU through the second master IOAPIC control section; and forwarding the third interrupt request to the first CPU through the link and the first master IOAPIC control section.

Also, the interrupt control method may be achieved by further storing a received interrupt request other than the first interrupt request and status data of the primary system at that time in a first status storage section of the first FT control section; and storing a received interrupt request other than the first interrupt request and status data of the primary system at that time in a second status storage section of the second FT control section.

Also, the interrupt control method may be achieved by further stopping operations of the first CPU and the second CPU by a SMI (system management interrupt) handler when a discrepancy of storage data is detected between the first and second status storage sections while the first CPU and the second CPU operate in synchronization with each other; controlling the first and second FT control section such that the setting data and the status data of the first and second status storage sections are coincident with each other; and restarting the operation of the first CPU and the second CPU when the setting data and the status data are coincident with each other between the first and second status storage sections.

BRIEF DESCRIPTION OF THE DRAWINGS

FIG. 8 is a diagram schematically showing a behavior that the same setting commands are forwarded to an active south bridge by routers;

FIG. 9 is a diagram showing a relationship between an IRQ table in the master IOAPIC of the FT control section and an IRQ table in IOAPIC of the south bridge;

DESCRIPTION OF THE PREFERRED EMBODIMENTS

Hereinafter, a fault tolerant computer system according to the present invention will be described in detail with reference to the attached drawings. The fault tolerant computer system of the present invention can be applied to, for example, a server system.

Figure 1:
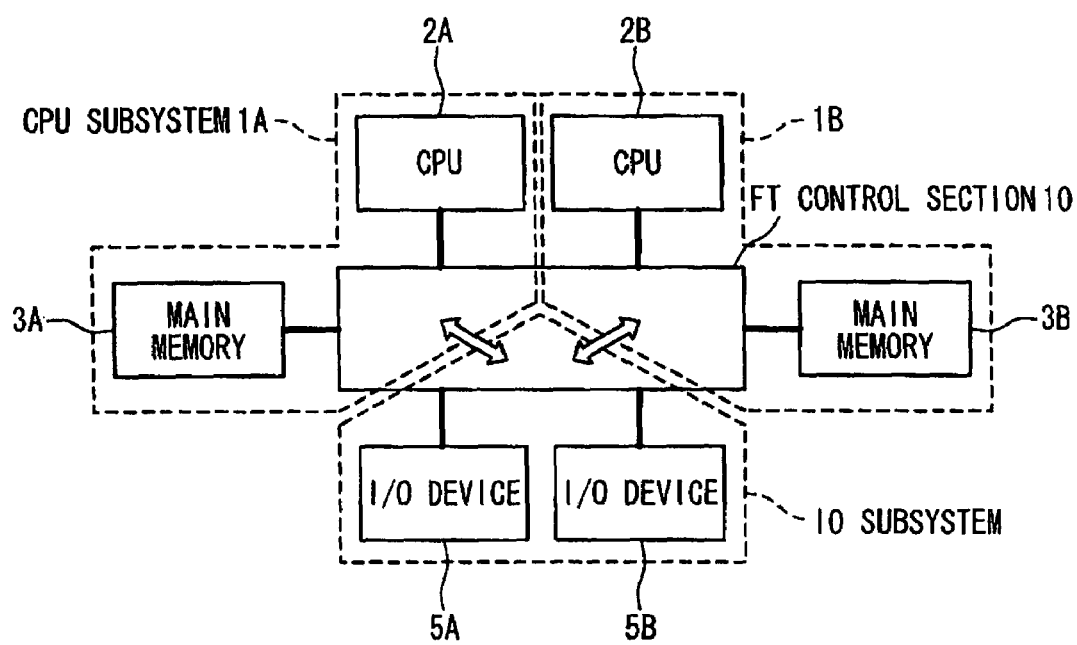
FIG. 1 is a block diagram showing an example of the configuration of a conventional fault tolerant computer system.
Figure 2:
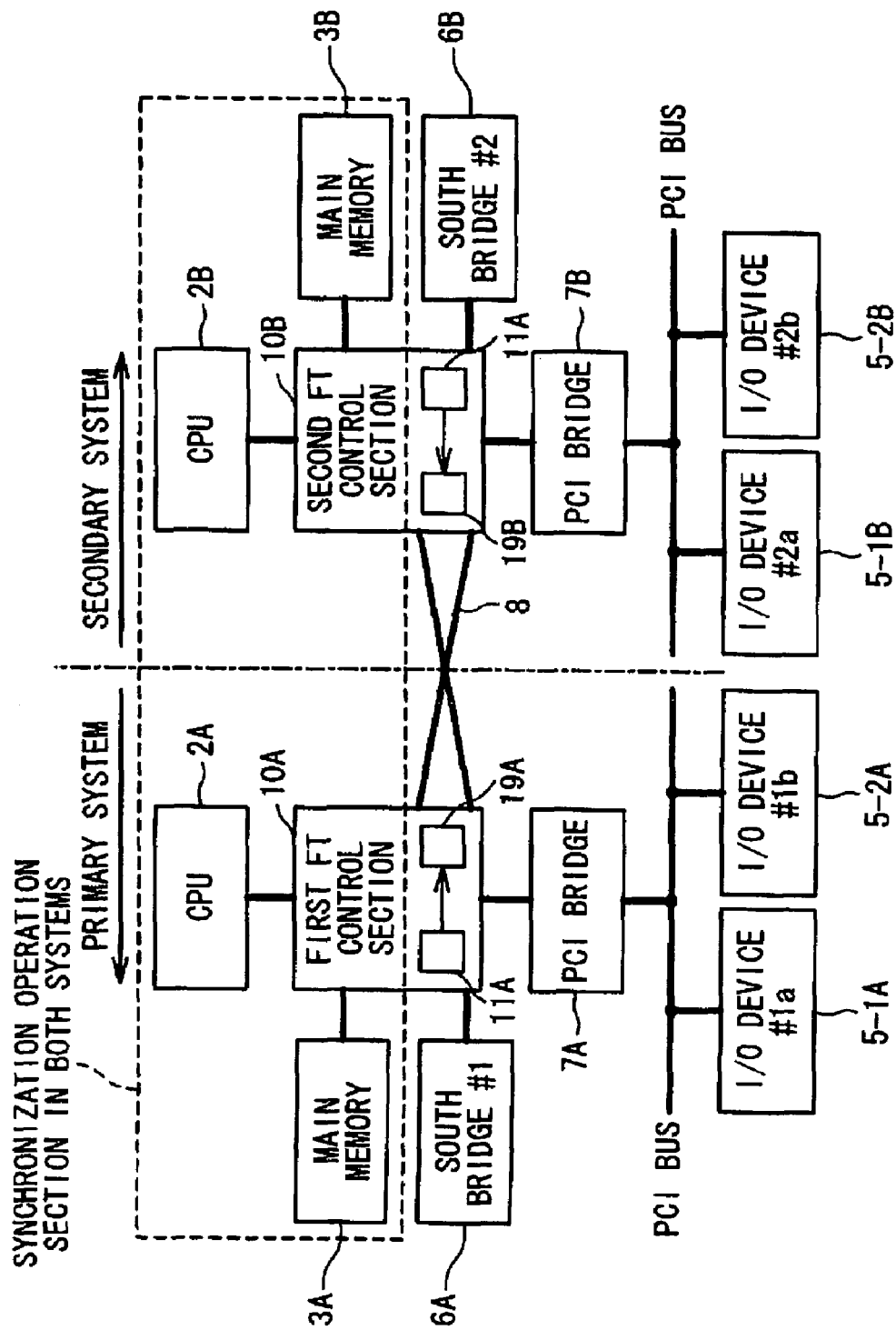
FIG. 2 is a block diagram schematically showing a basic configuration of a fault tolerant computer system according to an embodiment of the present invention.

FIG. 2 is a block diagram schematically showing a basic configuration of the fault tolerant computer system according to an embodiment of the present invention. As shown in FIG. 2, the fault tolerant computer system in this embodiment has two systems having a-same configuration, namely, a primary system #1 and a secondary system #2. Each of the primary system #1 and the secondary system #2 contains a fault tolerant (FT) control section 10 (10A, 10B), a CPU (Central Processing Unit) 2 (2A, 2B), a main memory 3 (3A, 3B), a south bridge 6 (6A, 6B), a PCI (Peripheral Component Interconnect) bridge 7 (7A, 7B), and I/O devices 5 (5-1A, 5-2A; 5-1B, 5-2B). It should be noted that a suffix "A" in the above description indicates the primary system, and another suffix "B" thereof shows the secondary system. The FT control section 10A is connected to the FT control section 10B by an FT link 8. In this embodiment, the FT control sections are duplexed, and interrupt controllers of the preset invention is built in the fault tolerant (FT) control sections 10A and 10B.

In order to allow a failed portion to be replaced by a normal portion, it is desirable that the primary system #1 and the secondary system #2 are arranged on separate boards. Also, it is ideal that the fault tolerant computer system is constituted from four boards or more such that CPU sub-systems having the CPU 2 and the main memory 3, and I/O sub-systems can be separated. Each of the two CPU sub-systems contains a CPU group (single CPU in this embodiment), the main memory 3, and an upper half portion of the FT control section 10 containing the interrupt controller. The two CPU sub-systems operate completely synchronously with each other, including clocks. The I/O sub-system is provided with the I/O device groups 5, the PCI bridges 7, and the south bridges 6, which are duplexed. The primary I/O sub-system and the secondary I/O sub-system have a completely same hardware configuration. The PCI bridge 7 connects the I/O devices 5 to the FT control section 10.

Figure 3:
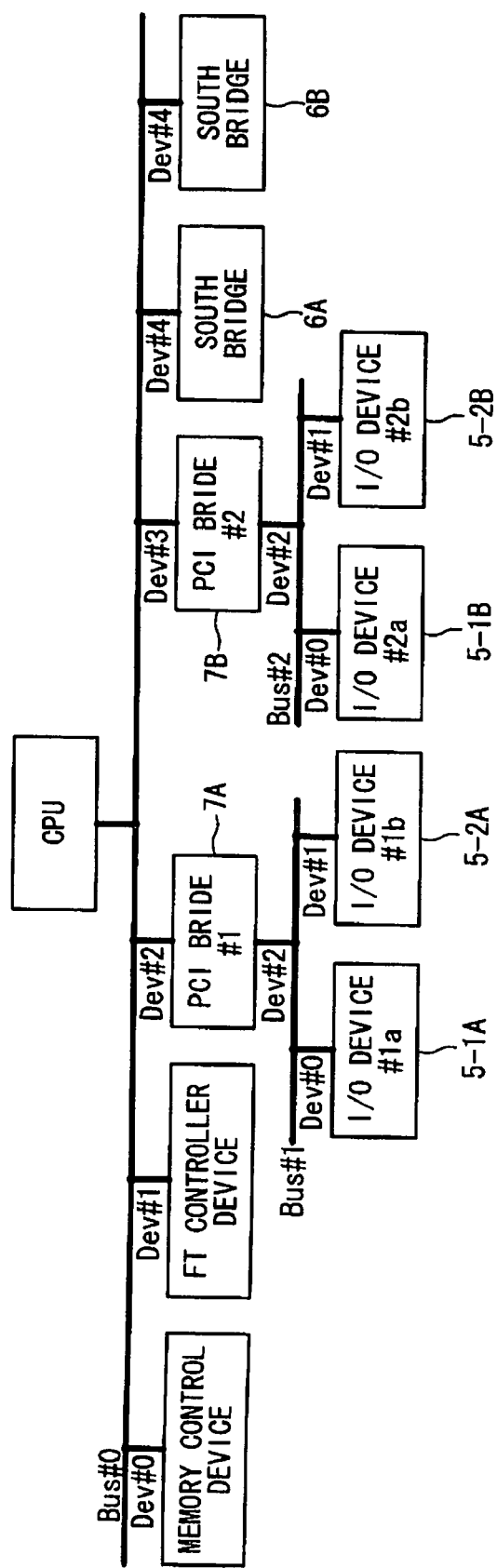
FIG. 3 is a block diagram showing a PCI (Peripheral Component Interconnect) hierarchical structure of the fault tolerant computer system shown in FIG. 2.

FIG. 3 is a block diagram showing a PCI hierarchical structure of the fault tolerant computer system according to this embodiment shown in FIG. 2. All of accessible devices have PCI bus numbers, PCI device numbers, and PCI function numbers in accordance with the PCI Specification. Also, the fault tolerant computer system according to this embodiment has the hierarchical structure in which the CPU is set as a summit. Although only the south bridges 6 have the completely same device number, only one of the south bridges 6 is used in a normal operation. In the below-mentioned description, the south bridge 6 being used is referred to as an "active south bridge" 6, whereas the other south bridge 6 is referred to as a "standby south bridge" 6, hereinafter. The standby south bridge 6 is logically disconnected from the FT control section 10, and no access to the standby south bridge 6 is allowed until a fail-over has occurred.

Figure 4:
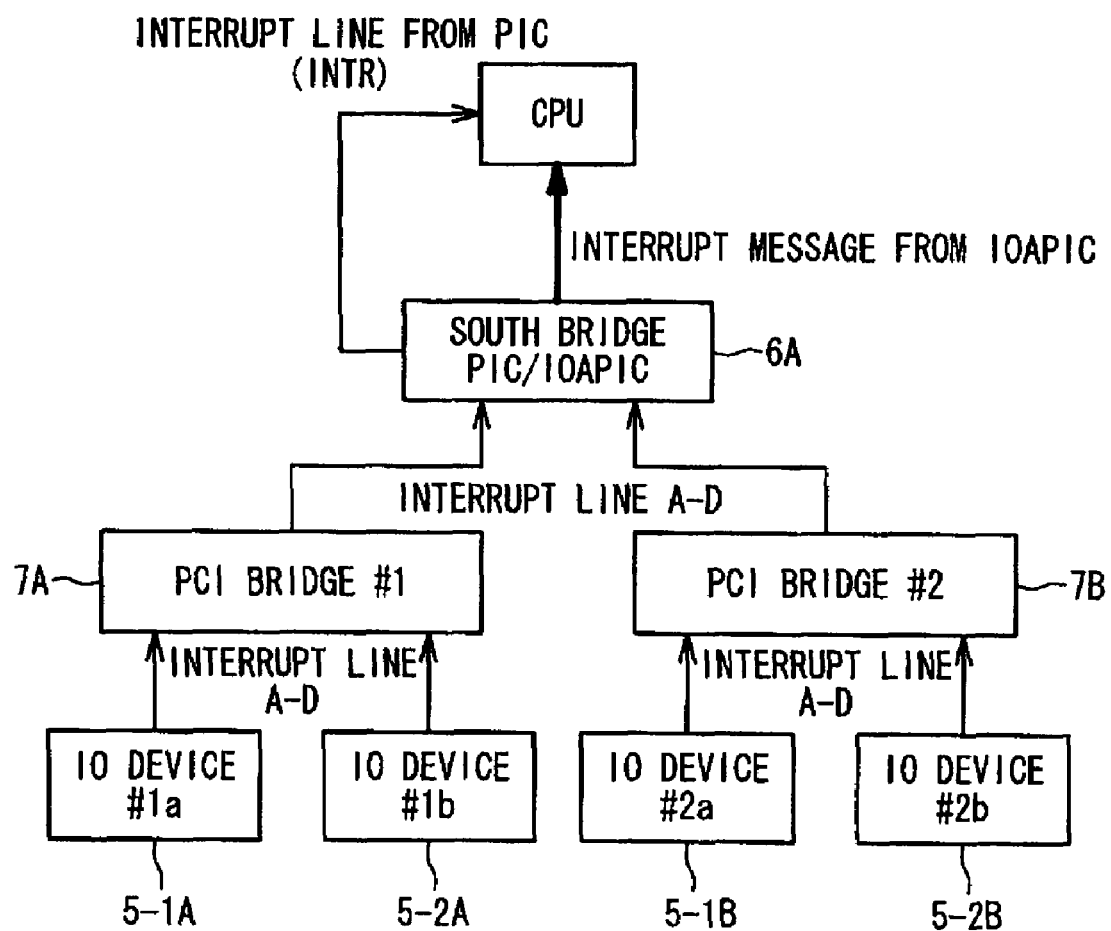
FIG. 4 is a block diagram schematically showing an interrupt routing of a PC server which is not duplexed.

FIG. 4 schematically shows an interrupt routing of a general PC server whose components are not duplexed. Each of I/O device groups (the PCI devices in this example) can have four interrupt lines (#A to #D) at maximum, and these interrupt lines #A to #D are once connected to the PIC bridge 7. The PIC bridge 7 connects the plurality of sets of interrupt lines in a wired-OR manner, and four wired-OR connected interrupt lines are connected to either PIC or IOAPIC (IO Advanced Programmable Interrupt Controller) of the south bridge 6. Normally, the legacy PIC and the extended IOAPIC are present in the south bridge 6. The present PC server is initiated in a legacy mode. In this case, the PIC is used as an interrupt controller. Also, when an OS (Operating System) such as the Windows and the Linux is operated, the operation of the PIC is stopped, and the IOAPIC having a higher function than that of PIC is used.

Figure 5:
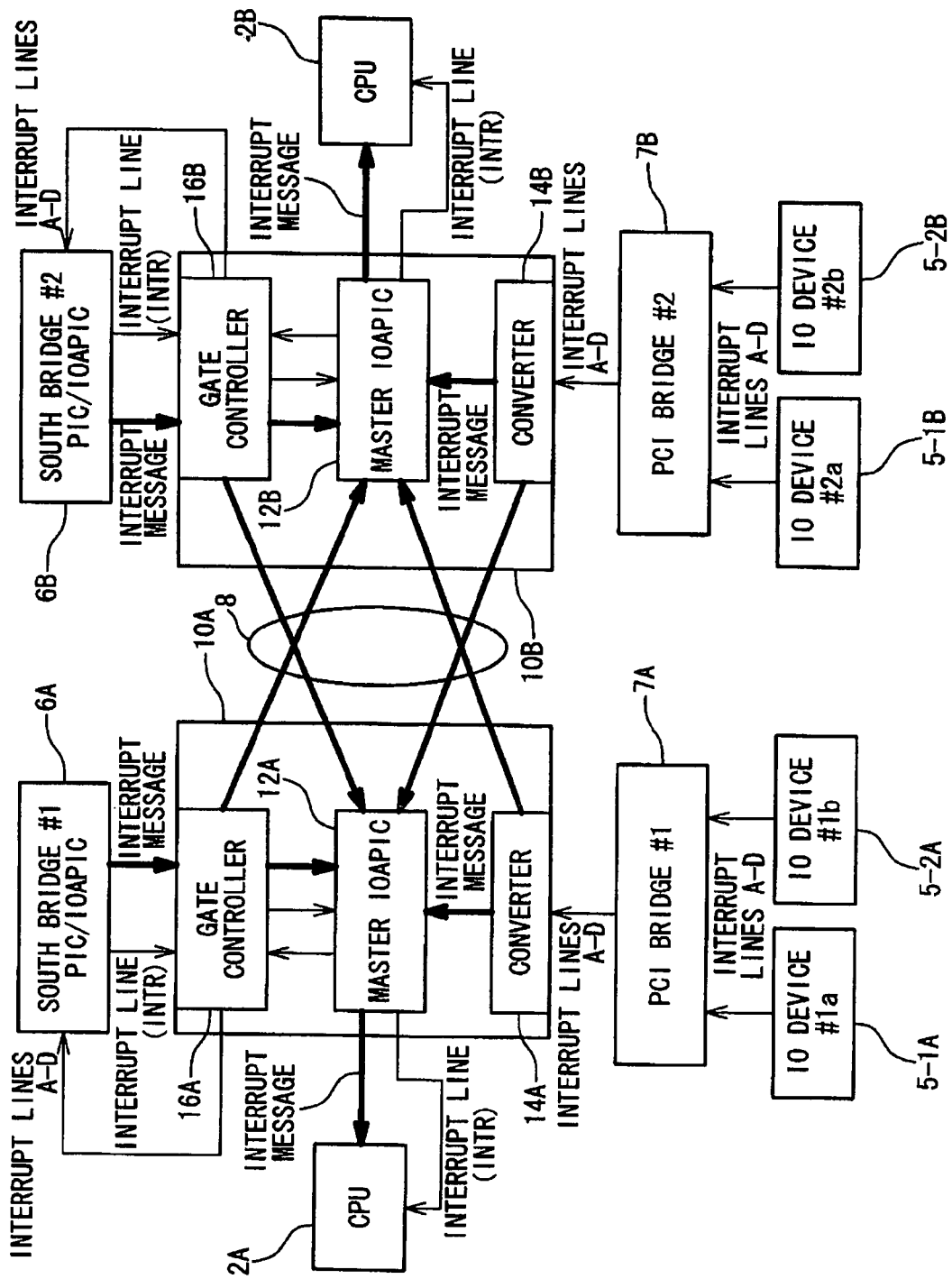
FIG. 5 is a block diagram schematically showing interrupt routing in an interrupt controller duplexed system of the fault tolerant computer system according to the embodiment of the present invention.

FIG. 5 is a block diagram schematically showing the interrupt routing in the fault tolerant computer system according to the present invention in which an interrupt controller is duplexed. Since the existing open-system devices and OS can be used in this fault tolerant computer system, duplication is achieved without contradiction to the above-explained operation. The master IOAPIC 12 in the FT control section 10 is visible from the OS and is present as only one interrupt controller. Two sets of the master interrupt controllers 12 provided in the FT control sections 10 in the primary and secondary systems operate in complete synchronization with each other.

An FT (fault tolerant) link 8 connects the FT control section #1 10A in the primary system and the FT control section #2 10B in the secondary system. The FT link 8 is used for access to the I/O device from the primary system to the secondary system, or from the secondary system to the primary system. Thus, the FT control section #1 10A in the primary system forwards only access requests to the PCI bridge #1 7A and the I/O device 5A managed by this PCI bridge #1 7A, to the FT control section #2 10B in the secondary system through the FT link 8. Similarly, the FT control section #2 10B in the secondary system receives the access request from the FT control section #1 10A in the primary system, and forwards only the access request to the PCI bridge #2 7B and the I/O device 5B managed by this PCI bridge #2 7B, to the FT control section #1 10A in the primary system through the FT link 8. Therefore, a region for synchronization check of both of the primary and secondary systems are limited to the above-described region. In other words, in the fault tolerant computer system of the present invention, synchronism check by the FT control section 10 is carried out in a distribution manner.

The south bridge 6 is provided with or is connected to devices called "legacy devices" such as a serial port, a parallel port, a mouse, a keyboard, a timer, and a clock, all of which are not shown, and each of which is solely present within a system. These legacy devices have predetermined addresses on the system, and the presence of more than one device on the system is not allowed. Also, these legacy devices are often directly accessed from the OS. The south bridge 6 employs an interrupt control which is different from that of the other I/O devices 5, and cannot be duplexed in software, unlike the other I/O devices 5. Therefore, even in the fault tolerant computer system of the present invention, only one of the south bridges in the primary system and the secondary system operates as an active south bridge. The other south bridge is in a standby state until a failure occurs in the active south bridge 6. Thus, the standby south bridge is invisible from the OS.

Figure 6:
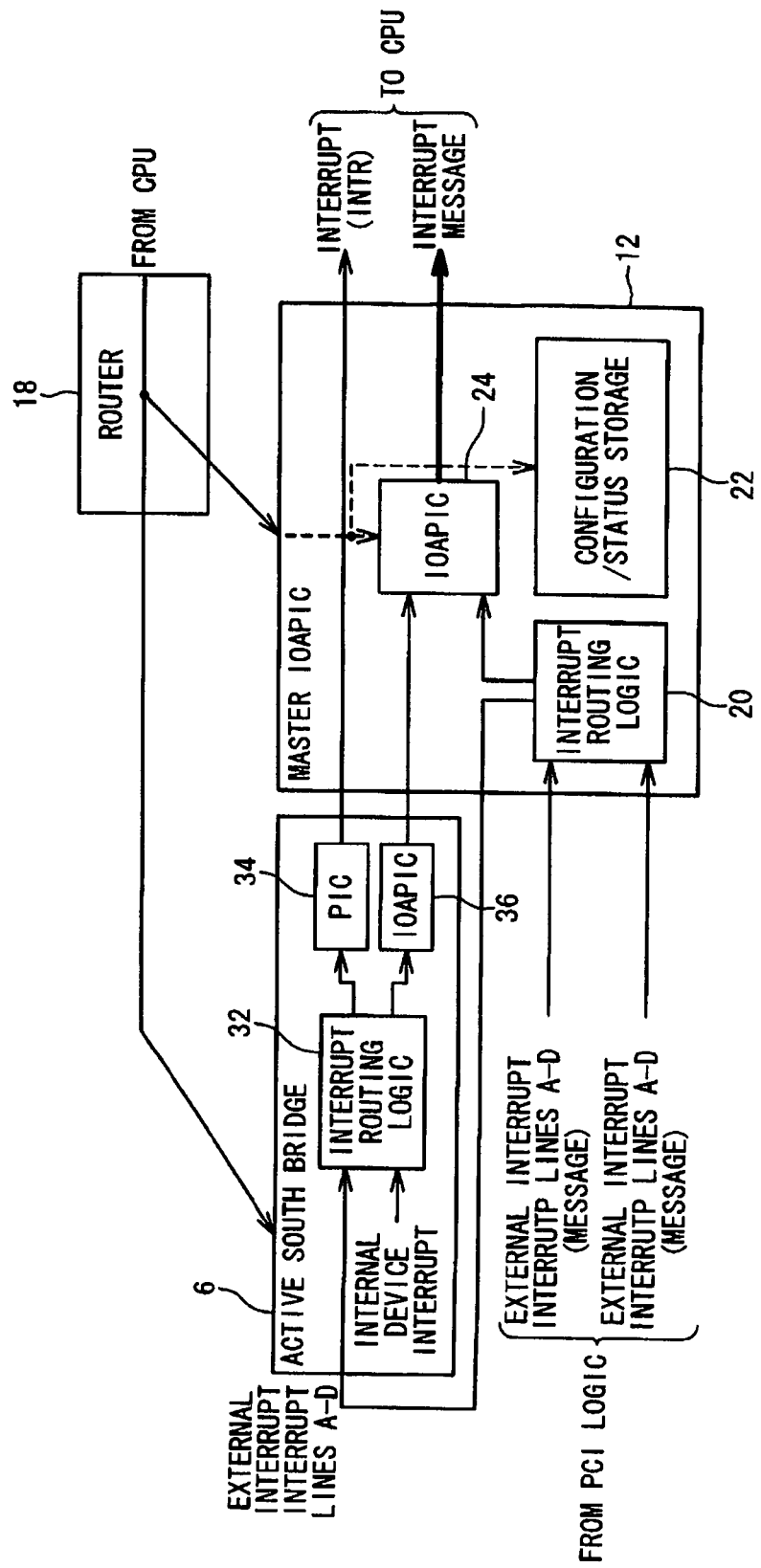
FIG. 6 is a block diagram schematically showing the configuration of a master IOAPIC (IO Advanced Programmable Interrupt Controller) in a fault tolerant (FT) control section.

FIG. 6 is a diagram schematically showing a configuration for forwarding an interrupt request between the FT control section 10 and the south bridge 6. The south bridge 6 has a general configuration, and is provided with an interrupt routing logic 32, a PIC 34, and an IOAPIC 36. The interrupt routing logic 32 receives the interrupt request issued form an external device or an internal device, and changes a notification destination to either PIC 34 or IOAPIC 36 depending on an operation mode. The PIC 34 is an interrupt controller in the legacy mode as the operation mode, and carries out the interrupt control for the legacy devices in the legacy mode on the initiation. The IOAPIC 36 is an interrupt controller in the extension mode as the operation mode, and is generally used in an Intel-compatible PC server. The IOAPIC 36 manages and controls interrupt requests related to the south bridge 6 and forwards the received interrupt request to a master IOAPIC 12 of the FT control section 10.

The FT control section 10 is provided with a router 18 and a master IOAPIC 12, which is provided with an IOAPIC 24, a configuration/status storage section (register group) 22, and an interrupt routing logic 20. The interrupt request from the PIC 34 of the south bridge 6 passes through the master IOAPIC 12 and is outputted as an interrupt (INTR). The interrupt routing logic 20 receives an INT #x message from the PCI bridge 7, and forwards the INT #x message to the IOAPIC 24 or through a gate controller to the interrupt routing logic 32 of the south bridge 6, depending on the operation mode.

All of setting data are set in the configuration/status storage unit 22 of the master IOAPIC 12, and the status can be known from the storage unit 22. The storage unit 22 stores data indicating the status of interrupt controller. The storage unit 22 is referred to by a system software on a fail-over. When a failure has occurred in a module for the FT control section 10 in the primary system of the fault tolerant computer system, the failed module is replaced by a new module. At this time, the status of interrupt controller of the failed module can be completely reproduced in the interrupt controller in the secondary system. The storage unit 22 holds the following data:

Setting data of IOAPIC;

Internal status of the IOAPIC control logic in the FT control section 10 (note that internal status is indicated as a binary status, the system software does not check this value for a process, but this internal status is purely used to copy internal status);

Setting data of PIC (although the FT control section 10 does not have a PIC function, the FT control section 10 uses this setting data to set in the south bridge 6 on a fail-over);

Internal status of the PIC control logic in the FT control section 10 (binary state);

Other setting data to interrupt controllers (register setting data unique to FT control section etc.); and Other internal statuses of interrupt controller logics (binary conditions).

All of the storage contents of the storage unit 22 are copied to a storage unit 22 of the newly module. Thus, the master IOAPIC 12 can be set to the completely same setting and also completely same operating state as those of the copy source. As a result, the new FT module in the one system can operate in the completely synchronization with the FT module in the other system.

Figure 7:
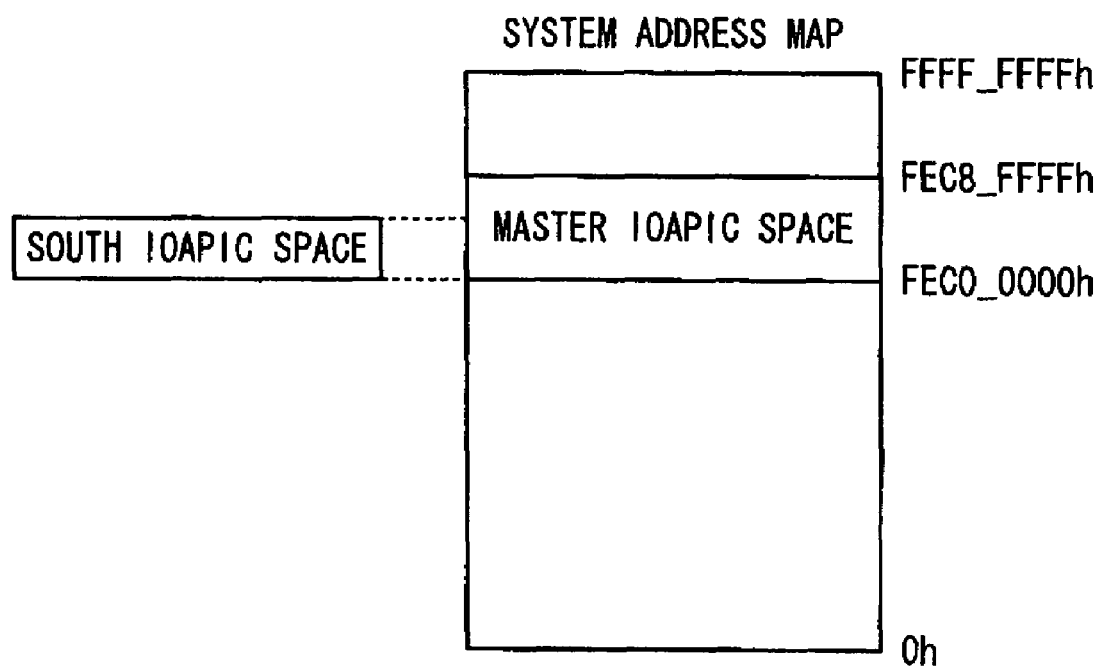
FIG. 7 is a diagram schematically showing an example of a system address map of the fault tolerant computer system according to the embodiment of the present invention.

FIG. 7 is a diagram schematically showing an example of a system address map of the fault tolerant computer system according to the present invention. The master IOAPIC 12 is mapped to, for example, FEC0_0000h to FEC8_FFFFh, and the setting of configuration/status is carried out to this space. An address space of the IOAPIC 36 within the south bridge 6 overlaps with a part of the address space of the master IOAPIC 12. Thus, in the fault tolerant computer system of the present invention, the IOAPIC 36 provided in the active south bridge 6 is hidden from either the CPU 2 or the OS, and is invisible. However, the setting of the IOAPFC 36 employed in the active south bridge 6 must be carried out. For this purpose, the address space of the IOAPIC 36 in the south bridge 6 is covered by the address space of the master IOAPIC 12.

FIG. 9 is a table showing a relationship between various sorts of devices and interrupt numbers (IRQs). The IRQ table on the left side is provided in the IOAPIC 36 of the active south bridge 6, and the IRQ table on the right side is provided in the IOAPIC 24 of the master IOAPIC 12 in the FT control section 10. Upon receipt of an interrupt factor, the IOAPIC directly notifies the IRQ to a CPU. For this purpose, the IRQ table is provided in the IOAPIC 24. The IRQ table of the IOAPIC 36 in the south bridge 6 has a general configuration, and in particular, IRQ0 to IRQ15 are fixedly determined in the Intel-compatible CPU system. The setting operation of the IRQ table of the IOAPIC 36 in the south bridge 6 is actually set to the IOAPIC 24 of the master IOAPIC 12. Since a same setting command is transmitted from the CPU 2A to the active standby south bridge 6A in the primary system and the standby south bridge 6B in the secondary system by the router 18. Therefore, the IRQ table of the IOAPIC 36 in the active south bridge 6A and the IRQ table of the IOAPIC 36 in the standby south bridge 6B are eventually set to the same contents, and the IRQ table of the IOAPIC 24 in the FT control section 10A and the IRQ table of the IOAPIC 24 in the FT control section 10B are eventually set to the same contents. Also, the contents of the IRQ table of the IOAPIC 24 contain the contents of the IRQ table of the IOAPIC 36. An interrupt message issued from the active south bridge 6A is directly replaced as an interrupt request received by the master IOAPIC 12. Also, the interrupt request issued from the PCI bridge 7 is allocated to IRQ20 to IRQ27, for example.

FIG. 8 is a diagram schematically showing a behavior that the same setting commands are forwarded to an active south bridge by routers. The FT control section 10 (10A, 10B) is provided with an error detecting unit 11 (11A, 11B), the master IOAPIC 12 (12A, 12B), a message converter 14 (14A, 14B), an FT comparator 15 (15A, 15B), a gate controller 16 (16A, 16B), a router 18 (18A, 18B), and a timer 19 (19A, 19B). The error detecting unit 11 and the timer 19 are shown in FIG. 2, and the master IOAPIC 12, the message converter 14, and the gate controller 16 are shown in FIG. 5. Also, the FT comparator 15, and the router 18 are shown in FIG. 8. Although not shown, the FT control section 10 is also provided with a synchronous operation guarantee control section for guaranteeing synchronous operations of the primary CPU sub-system and the secondary CPU sub-system.

The error detector 11 checks a request issued from either a CPU or an I/O device to detect an error having occurred in an internal unit or an I/O sub-system. When any error is detected, the error detector 11 produces an SMI (System Management Interrupt). The master IOAPIC 12 manages or controls an interrupt request in the extension mode in which an operating system (OS) operates on the CPU 2, and forwards an interrupt message corresponding to the interrupt request issued from the I/O sub-system to the south bridge 6 in the legacy mode in which the OS does not yet operate on initiation. Also, the master IOAPIC 12 passes an interrupt request from the south bridge 6 to the CPU 2 in the legacy mode. The message converter 14 converts an interrupt request issued from the I/O sub-system into an interrupt message.

The gate controller 16 connects the interrupt request from the master IOAPIC 12 to the south bridge 6, and connects the interrupt request from the south bridge 6 to the master IOAPIC 12. The router 18 forwards a data/command sent from the CPU to either the main memory 3 or the I/O subsystem, and forwards a data/command and an interrupt request from the I/O sub-system to either the main memory 3 or the CPU. Also, the router 18A of the FT control section 10A in the primary system forwards an interrupt request through the FT link 8 to the master IOAPIC 12B of the FT control section 10B in the secondary system. The forwarding of an interrupt request from the router 18B of the FT control section 10B to the master IOAPIC 12A of the FT control section 10A is similar. It should be noted that since a notification to the master IOAPIC 12 in another system is carried out through the FT link 8, a time lag is generated. However, since the above-described interrupt message is notified to the master IOAPIC 12 in its own system after a delay for a period of time predetermined based on this time lag, the interrupt message can be notified to the master IOAPICs 12A and 12B at substantially same timing.

The FT control section 10 is further provided with an external pin (not shown), and an active south bridge register (not shown). The external pin indicates a physical position of the module containing the FT control section 10, namely indicates that the FT control section 10 is present in either the primary system or the secondary system. The active south bridge register indicates an address location of the active south bridge 6. The FT comparator 15 compares two values with each other, and forwards a setting command issued from the CPU 2 through the router 18 to the active south bridge 6.

As shown in FIG. 8, a setting command issued from the CPU 2 is forwarded by the router 18 to the master IOAPIC 12, and is set in the master IOAPIC 12. Also, of the setting command, a command portion overlapping with the IOAPIC 36 of the south bridge 6 is forwarded by the router 18 to the FT comparator 15. The FT comparator 15 compares the setting command with a set of physical position data of the module and data of an active south bridge register, and forwards the setting command to the active south bridge 6, when the coincidence is not obtained. Thus, the setting state of the IOAPIC 36 of the south bridge 6 equivalently appears on the master IOAPIC 12. As a consequence, the overlapping portion of the setting in the IOAPIC 24 of the master IOAPIC 12 and the IOAPIC 36 can be set. In other words, a copy of IOAPIC having the completely same setting is produced.

The master IOAPIC 12 is a master interrupt controller, and manages interrupts of the entire system. The master IOAPIC 12 is an extended interrupt controller. When an interrupt factor has occurred, the master IOAPIC 12 notifies the occurrence of the interrupt to the CPU 2 together with an interrupt number in the form of a message. The two master interrupt controllers 12A and 12B provided in the FT control sections 10A and 10B in the primary and the secondary system operate completely in synchronization with each other by the synchronizing operation guarantee control section. An interrupt request issued from the PCI bridge 7A or 7B on any of the interrupt lines #A to #D is converted into INT #x assert message or INT #x dessert message by the message converter 14 (FIG. 5), and then the messages is notified to the IOAPICs 12A and 12B in the primary and secondary systems at the same time by the router 18.

The PIC (Programmable Interrupt Controller) 34 and IOAPICs (10 advanced Programmable Interrupt Controllers) 12 and 36. That are different from each other in the following points. That is, the PIC 34 is a legacy interrupt controller succeeding past legacy. When an interrupt factor has occurred, the PIC 34 outputs an interrupt request to the CPU 2 by using one interrupt line (INTR) as an INTR signal. Upon receipt of the INTR signal, the CPU 2 issues an interrupt acknowledge command to the PIC 34 and recognizes an interrupt number. On the other hand, the IOAPIC 12 or 36 is a further extended interrupt controller. When an interrupt factor has occurred, the IOAPIC 12 or 36 notifies an interrupt request in combination with an interrupt number in the form of a message to the CPU 2. Since the above-described different points are present, there are two systems of the notification of the interrupt to the CPU 2 in each of the primary and secondary systems.

An described above, in the present computer system, the PIC 34 is used in the legacy mode until the OS is initiated, whereas the IOAPICs 12 and 36 are used in the extension mode after the OS is initiated. Thus, the interrupt request path is switched.

As described above, active/standby gate controllers 16 (FIG. 5) are present in the FT control sections 10. The south bridge 6 is electrically connected to the FT control section 10 on the side of the standby side, but is logically disconnected from the FT control section 10. As a result, any notification of an interrupt to the south bridge 6 on the side of the standby gate controller 16 is blocked off.

It should be noted that the error detector 11 is periodically made active by the timer 19, the status storage units 22 in the primary and secondary systems may be compared with each other. As a result of this comparison, when an incoincidence between the statuses is detected, the incoincidence is notified to an SMI handler. The SMI handler stops the operation of the CPU 2, and executes a data transfer process in order that the storage data of the status storage units 22 in the primary and secondary systems are made identical to each other. Thereafter, the SMI handler restarts the operation of the CPU 2. In this manner, an error caused by an accumulation can be eliminated every time a predetermined time period has elapsed. Also, when the error detector 11 detects occurrence of a fault in either the south bridge 6 or other locations every time a preset time period has passed, or in response to a request issued from either the CPU 2 or the I/O device 5, the detected fault is notified to the SMI handler. The SMI handler stops the operation of the CPU 2. After a board where the failure has occurred is replaced by a new board, the SMI handler executes a data transfer process in order that the storage data of the status storage units 22 are made identical to each other between the primary system and the secondary system. Thereafter, the SMI handler restarts the operation of the CPU 2.

In the legacy mode, an output is present to connect the INT #x message issued from the PCI bridge 7 to the south bridge 6 by returning the INT #x message to the interrupt lines #A to #D in such a manner that the PIC 34 in the south bridge 6 can be used as a unique interrupt controller in the computer system. An interrupt to the CPU 2 is carried out by the master IOAPIC. An interrupt request INTR issued from the PIC 34 of the south bridge 6 and an interrupt message issued from the IOAPIC 36 are connected to the master IOAPIC 12 through the active/standby gate controller 16. Thus, the master IOAPIC 12 has a path of an INTR interrupt line passing the interrupt request INTR from the south bridge 6 through it directly to the CPU 2, and a path of an interrupt message processed in this master IOAPIC 12. Both of the paths are connected to the CPU 2.

In the extension mode after the legacy mode, the reception and transmission all of interrupt requests with the CPU 2 are all carried out through the master IOAPIC 12. In the extension mode, the master IOAPIC 12 manages or controls both of the interrupt from the active south bridge 6 and the interrupt from the PCI bridge 7. For this reason, a portion of the master IOAPIC 12 can be directly viewed from the IOAPIC 36 of the active south bridge 6. Therefore, the IOAPIC 36 in each south bridge 6 is made invisible from the computer system. This is a result of consideration of a case that a fault occurs in the south bridge 6. When the failure has occurred in the active south bride 6, the interrupt control of the master IOAPIC 12 is immediately replaced by the IOAPIC 36 of the standby south bridge 6. Therefore, increased and decrease of IOAPIC do not occur, viewing from the OS side.

Next, in the computer system shown in FIG. 2 of the embodiment of the present invention, it is assumed that the south bridge 6 on the side of the primary system is referred to as an "active south bridge", and is used for the normal process.

An operation of the active south bridge 6 in the legacy mode will be described. In the legacy mode, the PIC 34 functions as a center of interrupt control. When the PIC 34 is used, this PIC 34 is only one interrupt controller in the computer system and controls interrupts from all devices. Although the FT control section 10 can monitor interrupt statuses from the I/O devices 5-1 and 5-2 under control by the PCI bridge 7, the FT control section 10 cannot grasp statuses of devices in the south bridge 6. As a result, the PIC 34 in the active south bridge 6 is used.

Figure 10:
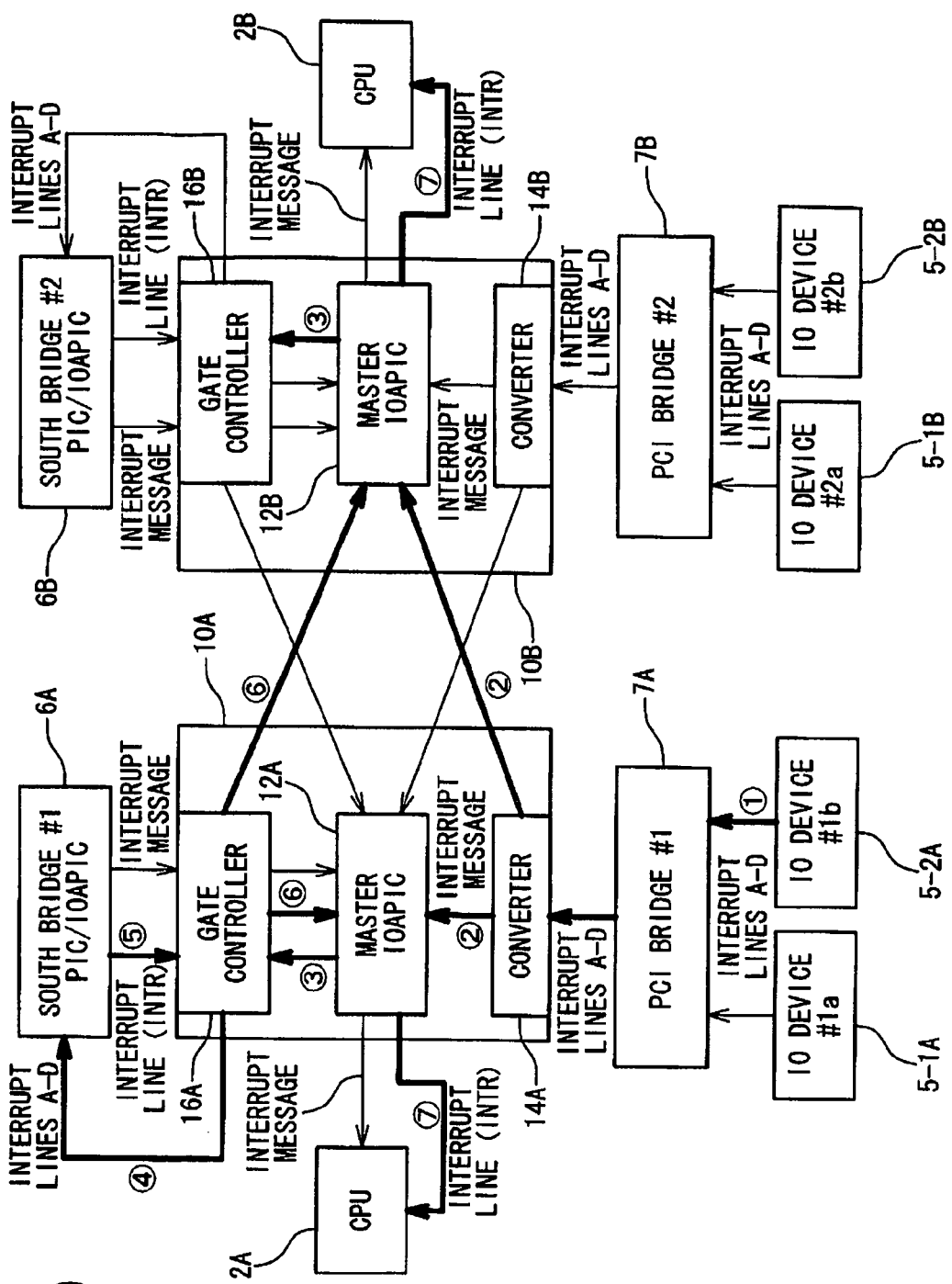
FIG. 10 is a diagram schematically showing an interrupt control operation in a legacy mode in the fault tolerant computer system according to the present invention.

Referring to FIG. 10, an interrupt signal from the PCI device #1b is asserted. At this time, the interrupt request is notified through the PCI bridge #1 7A to the message converter 14A in the FT control section 10A (step S1). The message converter 14A converts a status of a signal line, namely, the interrupt request into an INT #x assert message, and then notifies this INT #x assert message to the master IOAPICs 12A and 12B (step S2). This INT #x assert message is notified to the FT control section #2 10B through the FT link 8, and is notified to master IOAPIC 12A after a predetermined delay corresponding to the forwarding of the message to the master IOAPIC 12B. As a result, the master IOAPICs 12A and 12B in the primary and secondary systems receive the interrupt requests at the same time, and thus can operate in the completely synchronous manner.

The master IOAPICs 12A and 12B send the INT #x assert message to the gate controller 16A and 16B, respectively (step S3). When the gate controller 16A judges that the gate controller 16A itself is active based upon a board position pin and a value of the active south bridge register, the gate controller 16A returns the INT #x assert message to the interrupt signal line INT #x to notify to the south bridge 6 (step S4). Generally speaking, the south bridge 6 has the configuration as shown in FIG. 6, and an externally entered interrupt is supplied to the routing logic 32. It should be noted that interrupt requests from internal devices such as the serial port, the parallel port, the mouse, the timer, the keyboard, and the clock, which are originally present in the south bridge 6 are similarly supplied to the routing logic 32. In this case, an interrupt notification is started from this internal device.

Since the routing logic 32 in the south bridge 6 is in the legacy mode, the routing logic 32 notifies the interrupt request to the PIC 34. The PIC 34 asserts an interrupt line as an INTR signal (step S5). The gate controller 16A converts the INTR signal into an INTR assert message, and then notifies the converted INTR assert message to the master IOAPIs 12A and 12B. At this time, the INTR assert message is notified through the FT link 8 to the master IOAPIC 12B on the standby side. In an actual case, since the INTR assert message passes through the same path as that of the above-described INT #x message, the INTR assert message can be notified to the master IOAPICs 12A and 12B at the same time (step S6). When the master IOAPICs 12A and 12B accept the INTR assert message, the master IOAPICs 12A and 12B assert INTR to the CPUs 2 at the same time (step S7).

When a failure has occurred in the active south bridge 6 in the legacy mode, an interrupt is notified to the CPUs 2 to indicate the occurrence of the fault of the south bridge 6, so that the system software for fault tolerant control is called. An interrupt of the highest level is used for the call of the system software. For instance, a system management interrupt (SMI) is used in the Intel-compatible CPU. As a result, all of the processes which are being executed on the CPU 2 are once stopped. While these processes are stopped, the SMI handler copies all of the setting data of the active south bridge 6 to the standby side, and changes the values of the active south bridge registers. After the process by the SMI handler has been ended, the processes on the CPU 2 which have been once stopped are restarted. At this time, a fact that the south bridges 6 had been replaced is completely hidden.

Next, the interrupt control in the extension mode that the IOAPIC is used will be described.

Figure 11:
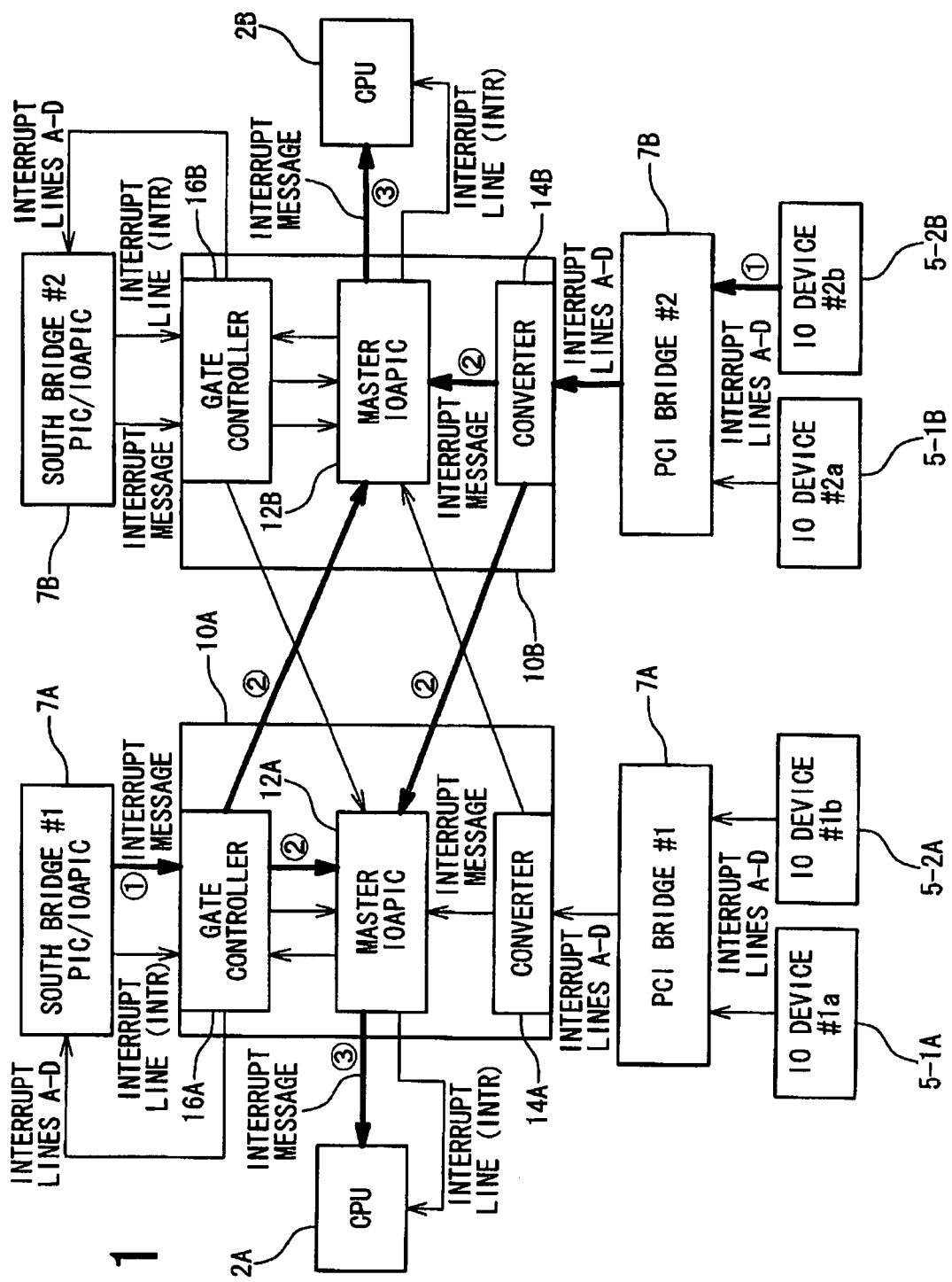
FIG. 11 is a diagram for illustratively showing an interrupt control in an extension mode in the fault tolerant computer system according to the present invention.

FIG. 11 shows an operation when the IOAPIC is used. It is assumed that the I/O device #2b 5-2A asserts an INTR signal (step S1). Also, it is assumed that the interrupt is notified through the PCI bridge #2 7B to the FT control section #2 10B as an interrupt signal "INT #C". The message converter 14B receives this interrupt signal INT #C and notifies an INT #c assert message to the master IOAPICs 12A and 12B in the primary system and the secondary system (step S2). The master IOAPICs 12A and 12B judge the interrupt "INT #c" issued from the PCI bridge #2 7B as an interrupt IRQ26, and then notify an interrupt message to the CPU 2 (step S3). Although detailed explanation is omitted, an interrupt issued from the south bridge 6 passes through a similar route.

As described above, according to the present invention, in the extension mode using the IOAPIC, when a failure has occurred in the south bridge 6, the SMI handler can refers to the configuration/status storage units 22 of the master IOAPICs 12A and 12B, and can set the completely same setting data with in the IOAPIC 36 in the standby-sided south bridge 6, like the legacy mode. As a result, the fault of the south bridge 6 can be hidden, viewing from the CPU 2.

Further, even in both of the legacy mode and the extension mode, the master IOAPICs 12A and 12B operate in the synchronization with each other. Therefore, even when a failure has occurred in one of the FT control sections 10 itself and the CPU sub-system is logically disconnected, the normal operation can be continued by the master IOAPIC 12 of the other FT control section 10. Thus, the interrupt request is never lost.

Furthermore, when the fault Ft control section 10 is replaced by a new FT control section 10, all of the setting data and the statuses of the master IOAPIC 12 in the new module and the IOAPIC 36 in the south bridge 6 are completely lost. However, the system software (SMI handler) refers to the configuration/status storage unit 22 of the master IOAPIC 12 in the system which is continuously operating, and copies the setting data and the status data. Thus, the completely synchronous state can be recovered.

As described above, the master IOAPIC 12 having the storage unit 22 for holding the configuration/status is mounted in the FT control section 10, and the interrupt routing control is carried out. Thus, the interrupt controllers can be duplexed. As a result, even in a server in which the existing OS and the existing south bridge produced without considering a fault tolerant computer system are installed, interrupt controllers can be duplexed.

What is claimed is:

1. A fault tolerant (FT) computer system comprising a primary system and a secondary system, wherein said primary system comprises:
a first CPU;
a first FT control section connected with said first CPU; and
a first south bridge connected electrically and operatively with said first FT control section,
said secondary system comprises:
a second CPU;
a second FT control section connected with said second CPU; and
a second south bridge connected electrically with said second FT control section and not connected operatively with said second FT control section,
said first FT control section and said second FT control section are connected by a link section, and
said primary system and said secondary system operate in synchronization with each other by using said link section, except for said second south bridge.

2. The fault tolerant computer system according to claim 1, wherein said first CPU and said second CPU operate on a same operating system, and
said second south bridge is invisible from said operating system.

3. The fault tolerant computer system according to claim 1, wherein said first FT control section has a first master I/O Advanced Programmable Interrupt Controller (IOAPIC) control section, and said second FT control section has a second master IOAPIC control section,
said first south bridge has a PIC control section and an IOAPIC control section,
an address space of said IOAPIC control section in said first south bridge is same as a part of an address space of said first master IOAPIC control section, and
an address space of said IOAPIC control section in said second south bridge is same as a part of an address space of said second master IOAPIC control section.

4. The fault tolerant computer system according to claim 3, wherein said primary system further comprises a first PCI bridge connected with said first FT control section and a first I/O device group connected with said first PCI bridge,
said secondary system further comprises a second PCI bridge connected with said second FT control section and a second I/O device group connected with said second PCI bridge, and
when said primary system is set as an active system and said secondary system is set to a standby system to operate in synchronization with said primary system, a first interrupt request from one of I/O devices of said first I/O device group is forwarded to said first CPU through said PIC control section of said first south bridge and said first master IOAPIC control section in a legacy mode in which the operating system does not yet operate.

5. The fault tolerant computer system according to claim 4, wherein said first interrupt request is forwarded to said second CPU through said link and said second master IOAPIC control section of said second FT control section, and to said first master IOAPIC control section of said first FT control section in a predetermined delay time.

6. The fault tolerant computer system according to claim 4, wherein a second interrupt request from said first south bridge is forwarded to said first CPU through said first IOAPIC control section, and is forwarded to said second CPU through said link and said second IOAPIC control section of said second FT control section, in an extension mode, in which said operating system operates, after said legacy mode.

7. The fault tolerant computer system according to claim 4, wherein in an extension mode, a second interrupt request from one of I/O devices of said first I/o device group is forwarded to said first CPU through said first master IOAPIC control section and forwarded to said second CPU through said link and said second master IOAPIC control section.

8. The fault tolerant computer system according to claim 4, wherein in an extension mode, a third interrupt request from one of I/O devices of said second I/O device group is forwarded to said second CPU through said second master IOAPIC control section, and is forwarded to said first CPU through said link and said first master IOAPIC control section.

9. The fault tolerant computer system according to claim 4, wherein said first and second FT control sections further comprise said first and second status storage sections which store setting data of the primary and secondary systems and status data which show statuses of the primary and secondary systems, respectively,
said first IOAPIC control section stores the received interrupt request other than said first interrupt request and the status data of said primary system at that time in said first status storage section, and
said second IOAPIC control section stores the received interrupt request other than said first interrupt request and the status data of said primary system at that time in said second status storage section.

10. The fault tolerant computer system according to claim 1, wherein said first and second FT control sections have first and second configuration/status storage sections configured to store setting data and status data of said primary and secondary systems, respectively, and
when a failure has occurred in said first south bridge while said primary system and said secondary system operate synchronously as an active system and a standby system, respectively, said setting data and said status data in said first configuration/status storage section of said first FT control section are forwarded to said second configuration/status storage section in said second FT control section, and
then, said secondary system operates as the active system.

11. The fault tolerant computer system according to claim 1, wherein said first and second FT control sections have first and second status storage sections which store setting data of the primary and secondary systems and status data which shows status of the primary and secondary systems, respectively, and
when a discrepancy of the storage data is detected between said first and second status storage sections while said first CPU and said second CPU operate in synchronization with each other, an SMI (system management interrupt) handler stops operations of said first CPU and said second CPU and controls said first and second FT control sections such that said setting data/status data stored in said first and second status storage sections are coincident with each other.

12. The fault tolerant computer system according to claim 1, wherein said first FT control section has a first master IOAPIC control section and said second FT control section has a second master IOAPIC control section,
each of said first CPU and said second CPU has a first interrupt path and a second interrupt path,
a first interrupt generated in said primary system at a time of a start is forwarded to said first and second CPU through said first and second master IOAPIC control sections and said first interrupt path, and
a second interrupt generated in said primary system or said secondary system at a time of operation is forwarded to said first and second CPUs through said first and second master IOAPIC control sections and said second interrupt path.

13. An interrupt control method comprising:
providing a fault tolerant computer system including a primary system and a secondary system,
wherein said primary system comprises a first CPU, a first FT control section connected with said first CPU, a first south bridge connected electrically and operatively with said first FT control section, a first PCI bridge connected with said first FT control section, and a first I/O device group connected with said first PCI bridge,
said secondary system comprises a second CPU, a second FT control section connected with said second CPU, a second south bridge connected electrically and not connected operatively with said second FT control section, a second PCI bridge connected with said second FT control section, and a second I/O device group connected with said second PCI bridge,
said first FT control section and said second FT control section are connected by a link section, and
said first FT control section has a first master IOAPIC control section and said second FT control section has a second master IOAPIC control section;
transferring a first interrupt request issued from one of I/O devices of said first I/O device group to said first master IOAPIC control section in a legacy mode, in which an operating system does not yet operate, when said primary system is set as an active system and said secondary system is set as an standby system and operates in synchronization with said primary system;
forwarding said first interrupt request to said second master IOAPIC control section of said second FT control section through said link section;
transferring said first interrupt request to said first CPU from said first master IOAPIC control section by transferring said first interrupt request to said first master IOAPIC control section through a PIC control section of said first south bridge; and
transferring said first interrupt request to said second CPU from said second master IOAPIC control section by transferring said first interrupt request to said second master IOAPIC control section through said PIC control section of said first south bridge.

14. The interrupt control method according to claim 13, wherein a timing when said first interrupt request reaches said first master IOAPIC control section is same as a timing when said first interrupt request reaches said second master IOAPIC control section.

15. The interrupt control method according to claim 13, further comprising:

forwarding a second interrupt request issued from said second south bridge from said first IOAPIC control section to said first CPU in an extension mode, in which said operating system operates, after said legacy mode; and
forwarding said second interrupt request from said second IOAPIC control section of said second FT control section to said second CPU through said link.

16. The interrupt control mention according to claim 15, further comprising:
forwarding said second interrupt request to said first CPU through said first master IOAPIC control section in said extension mode;
forwarding said second interrupt request to said second CPU through said link and said second master IOAPIC control section.

17. The interrupt control method according to claim 13, further comprising:
forwarding a third interrupt request from one of I/O devices of said second I/O device group in said extension mode to said second CPU through said second master IOAPIC control section; and
forwarding said third interrupt request to said first CPU through said link and said first master IOAPIC control section.

18. The interrupt control method according to claim 13, further comprising:
storing a received interrupt request other than said first interrupt request and status data of said primary system at that time in a first status storage section of said first FT control section; and
storing a received interrupt request other than said first interrupt request and status data of said primary system at that time in a second status storage section of said second FT control section.

19. The interrupt control method according to claim 18, further comprising:
stopping operations of said first CPU and said second CPU by a SMI (system management interrupt) handler when a discrepancy of storage data is detected between said first and second status storage sections while said first CPU and said second CPU operate in synchronization with each other; and
controlling said first and second FT control section such that the setting data and said status data of said first and second status storage sections are coincident with each other; and
restarting the operation of said first CPU and said second CPU when said setting data and said status data are coincident with each other between said first and second status storage sections.

* * * * *